United States Patent [19]

Sakata et al.

[11] Patent Number: 5,269,431
[45] Date of Patent: Dec. 14, 1993

[54] RESERVOIR TANK

[75] Inventors: Shinji Sakata, Nishio; Toshihiro Nakano, Chiryu; Hitoshi Ichioka, Toyota; Yasuyuki Hanai, Kariya, all of Japan

[73] Assignee: Aisin Seiki Kabushiki Kaisha, Kariya, Japan

[21] Appl. No.: 857,436

[22] Filed: Mar. 25, 1992

[30] Foreign Application Priority Data

Mar. 25, 1991 [JP] Japan .................. 3-60555
Mar. 27, 1991 [JP] Japan .................. 3-63352

[51] Int. Cl.$^5$ .................................... B65D 51/16
[52] U.S. Cl. ................................ 220/205; 220/209; 220/302; 220/303; 220/304; 220/374; 220/DIG. 32
[58] Field of Search ............... 220/202, 203, 205, 209, 220/300, 301, 302, 303, 304, 373, 374, DIG. 32, DIG. 33

[56] References Cited

U.S. PATENT DOCUMENTS

| | | | |
|---|---|---|---|
| 3,454,183 | 7/1969 | Fuchs | 220/303 |
| 3,527,376 | 9/1970 | Young, Jr. | 220/209 |
| 4,102,472 | 7/1978 | Sloan, Jr. | 220/295 |
| 4,660,747 | 4/1987 | Borg et al. | |
| 4,987,740 | 1/1991 | Coleman | 220/203 X |
| 5,071,020 | 12/1991 | Reutter | 220/203 |
| 5,152,419 | 10/1992 | Yanagi | 220/374 |

FOREIGN PATENT DOCUMENTS 9008439.7 6/1990 Fed. Rep. of Germany .
63-145158 6/1988 Japan .
788207 12/1957 United Kingdom .

*Primary Examiner*—Allan N. Shoap
*Assistant Examiner*—Stephen Cronin
*Attorney, Agent, or Firm*—Oblon, Spivak, McClelland, Maier & Neustadt

[57] ABSTRACT

A reservoir tank includes a tank body storing an amount of operating fluid and having an inlet, a cap detachably mounted on the inlet of the tank body, a deflector secured to the cap so as to be located in the inlet and having a first passage which is in fluid communication with the atmosphere and a second passage which is in fluid communication with an inner space of the tank body, a diaphragm located between the cap and the deflector and having a slit valve which is set to be opened by a pressure difference thereacross, and an interruption body located between the deflector and the diaphragm so as to oppose to the second passage of the deflector and having a passage which enabling the fluid communication between the second passage of the deflector and the slit.

5 Claims, 3 Drawing Sheets

RESERVOIR TANK

BACKGROUND OF THE INVENTION

The present invention relates to a reservoir tank, and in particular to a cap of a reservoir tank.

In general, a conventional reservoir tank to be used in association with a brake master cylinder which is disclosed for example in Japanese Patent Laid open Print No.63(1988)-145158 is set to store an amount of operating fluid to be used in the brake master cylinder. During vehicle's travel, the vibration as a result thereof is transmitted to the reservoir tank, thereby generating the waving of the surface of the operating fluid. Since a cap for closing an opening of a tank body is Provided with a passage which is set to establish an air communication between an inner space of the tank body and the atmosphere, the resultant waving fluid is subject to leak through the passage. In light of this phenomena, in a conventional reservoir tank, a deflector is formed at a lower portion of the cap and a diaphragm is disposed between the cap and the deflector in order to prevent the waving fluid from reaching the cap.

However, in the foregoing improved structure, a slit is formed in the diaphragm and a hole is formed in the deflector for maintaining the inner space of the reservoir tank at the atmospheric pressure, resulting in that the fear of the leakage of the operating fluid through the hole and the slit.

SUMMARY OF THE INVENTION

It is, therefore, an object of the invention to provide a reservoir tank without the above conventional drawback.

It is another object of the invention to provide a reservoir tank in which the leakage of an operating fluid is prevented.

In order to attain the foregoing objects, a reservoir tank includes a tank body storing an amount of operating fluid and having an inlet, a cap detachably mounted on the inlet of the tank body, a deflector secured to the cap so as to be located in the inlet and having a first passage which is in fluid communication with the atmosphere and a second passage which is in fluid communication with an inner space of the tank body, a diaphragm located between the cap and the deflector and having a slit valve which is set to be opened by a pressure difference thereacross, and an interruption body located between the deflector and the diaphragm so as to oppose to the second passage of the deflector and having a passage which enabling the fluid communication between the second passage of the deflector and the slit.

BRIEF DESCRIPTION OF THE DRAWINGS

The above and other objects, features and advantages of the present invention will be more apparent and more readily appreciated from the following detailed description of preferred exemplarily embodiments of the present invention, taken in connection with the accompanying drawings, in which.

DESCRIPTION OF THE PREFERRED EMBODIMENT

Figure 1:
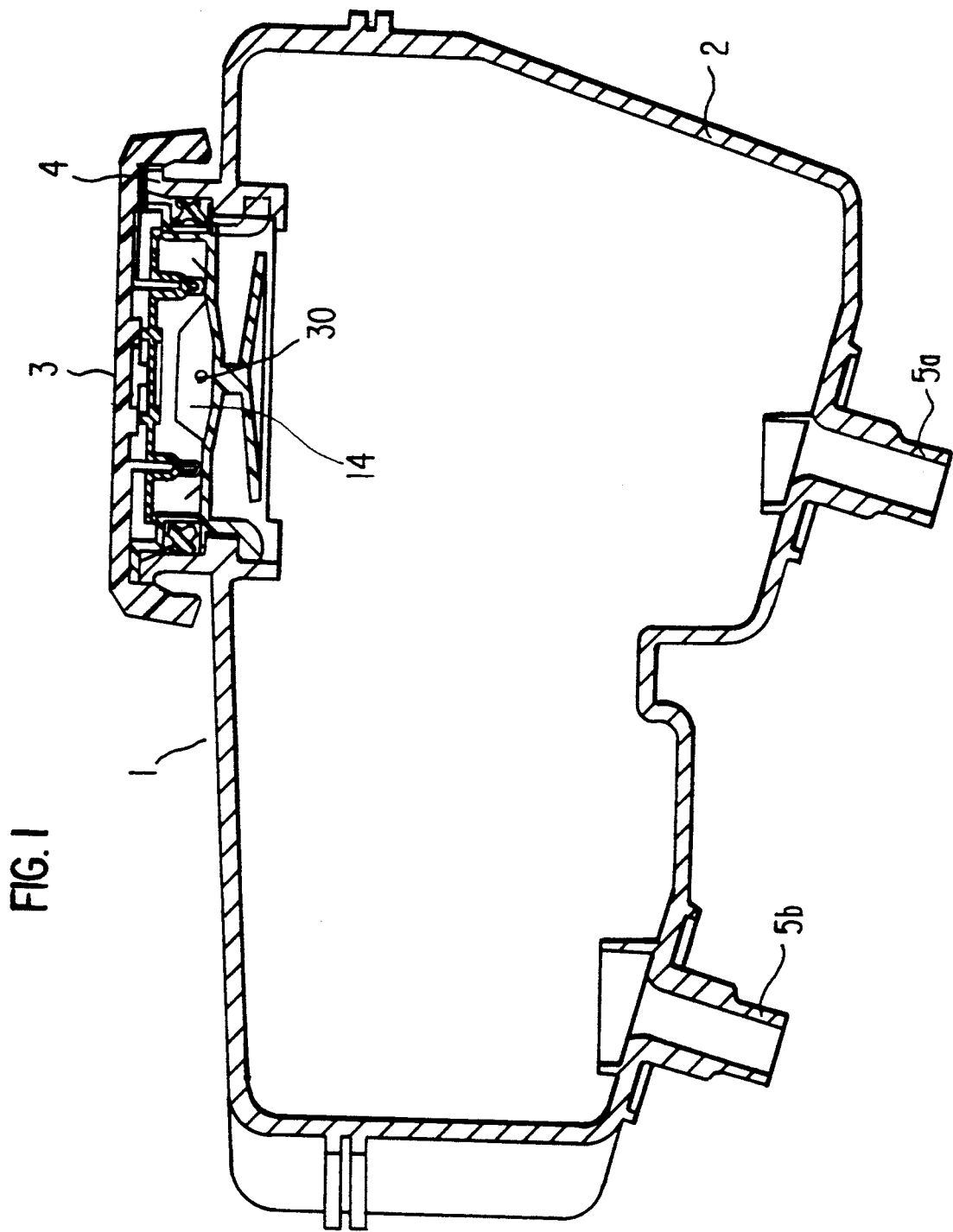
FIG. 1 is a cross-sectional view of a reservoir tank according to the present invention.
Figure 2:
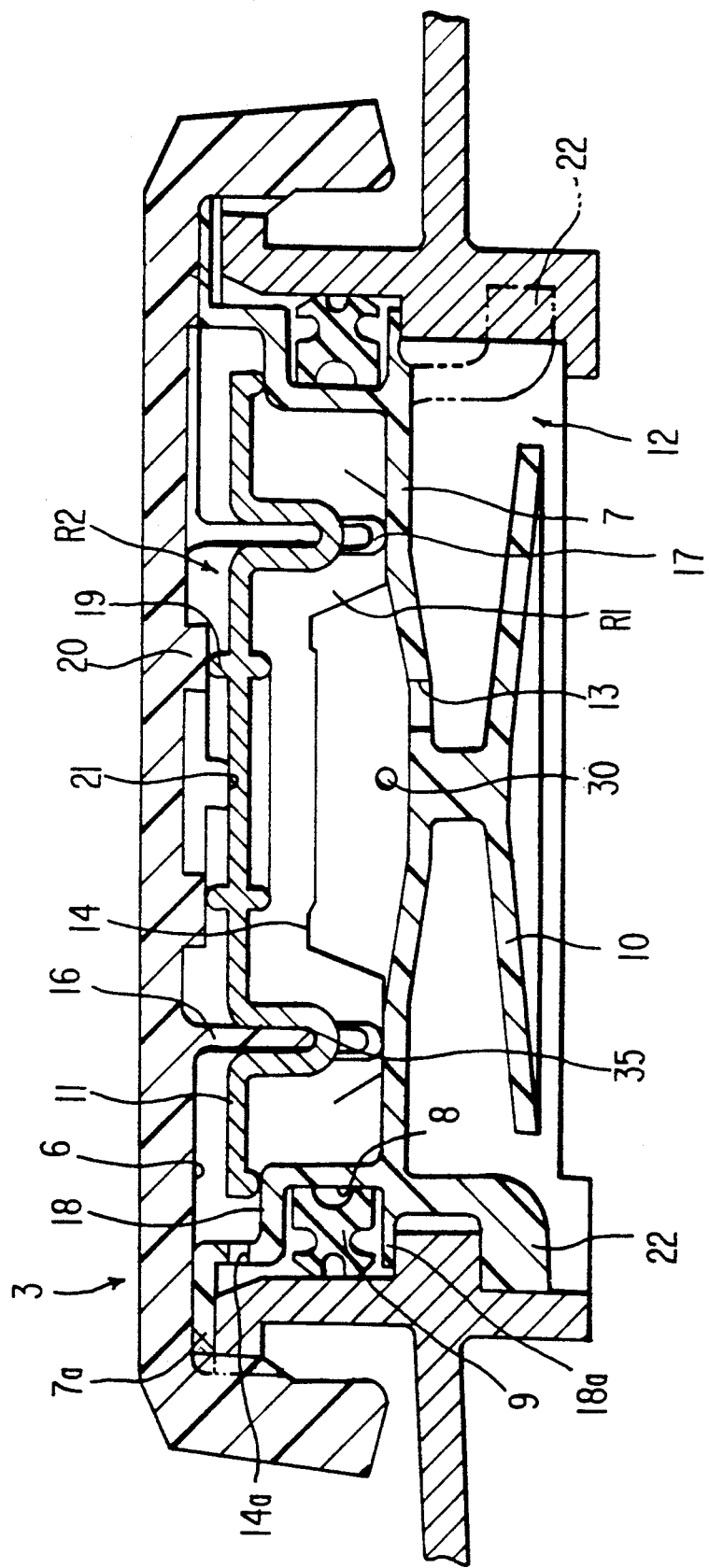
FIG. 2 is a partial cross-sectional view of a cap for the reservoir tank according to the present invention.
Figure 3:
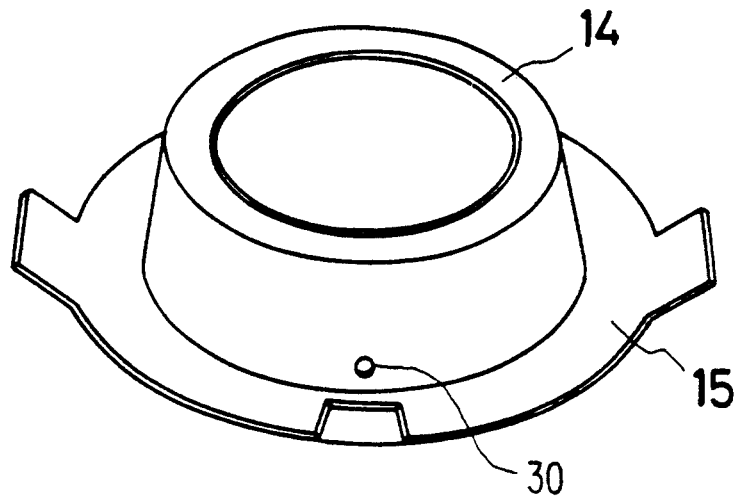
FIG. 3 is a perspective view of an interruption body which is an essential component of a reservoir tank according to the present invention.

Referring to FIGS. 1 through 3, a reservoir tank 1 includes a cap 3 is formed into a shallow inverted U-shaped configuration in cross-section. An inner periphery of the cap 3 is threaded so as to be engaged with an outer periphery of an inlet 4 of a tank body 2. A deflector 7 which is secured to a lower surface 6 of the cap 3 has a stepped portion 18 at its outer periphery and a reflector 10 at its lower portion. The tank body 2 has a pair of outlets 5a and 5b which are so connected to corresponding portions of a master cylinder as to be in fluid communication with the corresponding chambers in the master cylinder.

The stepped portion 18 and an extension 18a constitute therebetween an annular groove 8 in which a sealing member 9 is snugly fitted. The sealing member 9 is set to be in fluid-tight contact with an inner periphery of the inlet 4 when the cap 3 is mounted on the tank body 2. At the lower surface 6 of the cap 3, there are formed a pair of opposed semi-circular projections 16 (only one is shown) both of which are coaxially arranged.

A diaphragm 11 which is formed into a cylindrical configuration is disposed between the cap 3 and the deflector 7 and an upper opening groove 35 is snugly fitted with the pair of projections 16. An outer periphery flange of the diaphragm 11 is mounted on the stepped portion 18 of the deflector 7. Thus, an inner space defined between the cap 3 and the deflector 7 is divided into an upper space R2 and a lower space R1. The diaphragm 11 is formed at its central portion with a straight slit 21 for establishing the fluid communication between the upper and lower spaces R2 and R1. It is to be noted that though the illustrated slit 21 is an opened condition, it is closed in reality and is opened elastically only by a pressure difference thereacross. At a larger radius portion of the deflector 7, there is formed a passage 14a for the fluid communication between the outside and the inside of the tank body 2.

Within the lower space R1, there is accommodated an interruption body 14 formed into a frustum configuration and having an outward flange 15. The flange 15 of the interruption body 14 is set to be held between a plurality of downward projections 17 formed integrally with a bottom of the diaphragm 11 and the deflector 7. A hole 30 in the interruption body 14 is in fluid communication with the lower space R1 which is also in fluid communication with a space above the operating fluid via a passage 13 formed in the deflector 7.

A pair of opposite projections 22 are extended in the downward direction from a lower surface of the deflector 7. Each of the Projections 22 is of an L-shaped configuration in cross-section, is of an elastic property and can be inserted into the inlet 4.

During the vehicle's travel at a speed, if an amount of the operating fluid enters the above of the deflector 7 through the hole 13 thereof, the coming of the fluid or adhesion of the fluid on the diaphragm 11, especially on the slit 21 thereof, can be prevented. Thus, no fluid-leakage through the slit 21 is occured.

Figure 4:
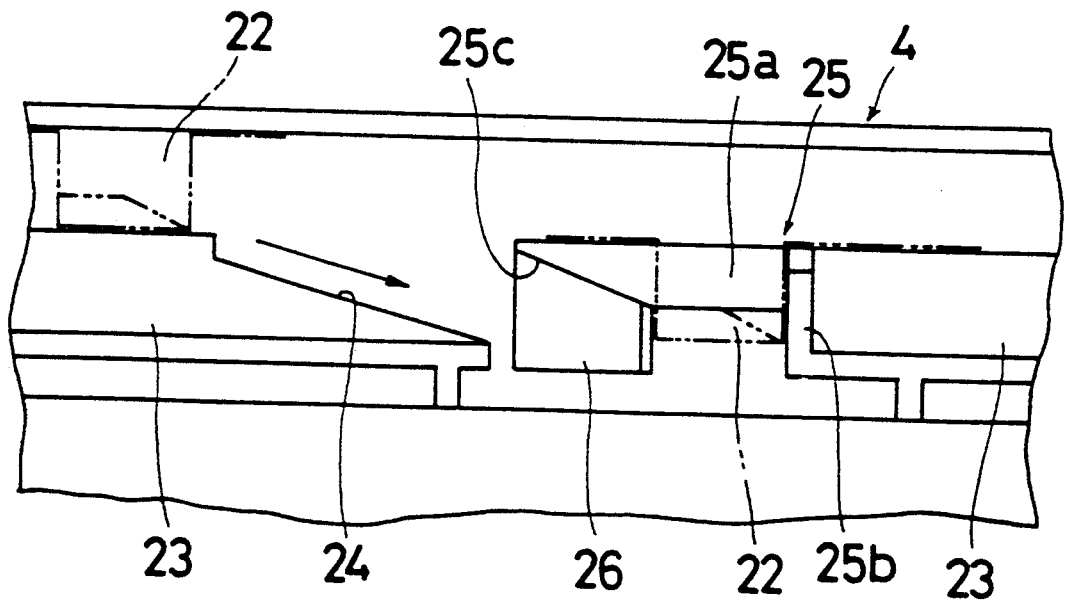
FIG. 4 is a view for illustrating the mounting manner or procedure of a cap on a tank body.

As shown in FIG. 4, at an inner periphery of the inlet 4, there are provided a pair of opposed guide members 23. Upon mounting of the cap 3 on the inlet 4, each projection 22 is engageble with an upper surface of the corresponding guide member 23. At an end of each guide member 23, there is formed a slant surface 24 toward the other guide member 23. When the cap 3 is rotated in a direction under a condition shown in FIG. 4, each projection 22 is moved or guided along the slant surface 24 and another slant surface 25c opposed to the slant surface 24 which belongs to another guide member 23 and is reached at a position at which the projection 23 is prevented further movement by a stopper 25b and is also prevented being extracted from the inlet 4 by a stopper 25a. During transfer of the projection 22 corresponding to about a half rotation of the cap 3, a projection 26 gives a suitable reaction force to the cap 3 and the projection 23 of the cap 3 has to be set climb over the projection 26 just before the termination of its transfer.

It is to be noted that in the foregoing structure, one or more rotations of the cap 3 with being held by the operator's hand is not required in order to mount the cap 3 on the inlet 4, and no thread portion is required at the cap 3 and/or the inlet 4 which results in the delimitation of a complex moldings for the production of the tank body 2. In addition, by the combination of the flexible projection 23 and the projection 26 which is located in the course of the projection 23 constitute a gradually increasing resistance or reaction force to which enables the recognition of the operator whether the cap 3 is mounted on the inlet 4 expectedly or not.

Obviously, many modifications and variations of the present invention are possible in light of the above teachings. It is, therefore, to be understood that within the scope of the appended claims, the invention may be practiced otherwise than as specifically described.

What is claimed is:

1. A reservoir tank comprising:
    a tank body storing an amount of operating fluid and having an inlet;
    a cap detachably mounted on the inlet of the tank body;
    a deflector secured to the cap so as to be located in the inlet to define an inner space between the cap and the deflector, the deflector having a first passage providing fluid communication between the inner space and the atmosphere and a second passage providing fluid communication between the inner space and an interior of the tank body;
    a diaphragm located in the inner space and having a slit valve which is set to be opened by a pressure difference thereacross; and
    an interruption body located in the inner space between the deflector and the diaphragm so as to cover the second passage of the deflector and having a passage permitting fluid communication between the second passage of the deflector and the slit.

2. A reservoir tank according to claim 1, wherein the interruption body is in the form of a frustum configuration which has an outward flange held between a plurality of downward projections formed integrally with a bottom of the diaphragm and the deflector.

3. A reservoir tank according to claim 1, wherein the cap is provided with a pair of angularly spaced projections which are inserted in the inlet, a pair of angularly spaced guide members which are provided at an inner periphery of the inlet in such a manner that upon mounting of the cap on the inlet each projection is on an upper portion of the corresponding guide member, each guide member is provided with a slant surface which extends from its upper portion to a lower portion so that each of the slant surfaces is set to guide the corresponding Projection of the cap in such a manner that the projection of the cap is moved along the slant surface to a lower portion of the other guide member while the cap is rotated through an angle less than 360 degrees, the projection of the cap upon completion of the rotation thereof is brought into engagement with a stopper which is formed at the other guide member in order to prevent a further movement and an upward movement of the projection.

4. A reservoir tank according to claim 3, wherein between the slant surface and the stopper a projection is provided in order to give a reaction force while the projection is in engagement with the projection of the cap.

5. A cap for closing a reservoir tank, comprising:
    a deflector secured to the cap so as to be located at a side of the reservoir tank and having a first passage which is in fluid communication with the atmosphere and a second passage which is in fluid communication with an interior of the reservoir tank;
    a diaphragm located between the cap and the deflector and having a slit which is set to be opened when the pressure in the reservoir tank exceeds the atmospheric pressure; and
    an interruption body having a passage and located between the deflector and the diaphragm in such a manner that the second passage of the deflector is prevented from being opposed to the slit, the second passage in fluid communication with the slit via the passage.

* * * * *